United States Patent Office 3,709,871
Patented Jan. 9, 1973

3,709,871
PHENYL-AZO-NAPHTHYL DYESTUFFS
Reiner Ditzer, Cologne, and Horst Nickel, Leverkusen, Germany, assignors to Farbenfabriken Bayer Aktiengesellschaft, Leverkusen, Germany
No Drawing. Filed Mar. 6, 1970, Ser. No. 17,311
Claims priority, application Germany, Sept. 3, 1969, P 19 44 699.2
Int. Cl. C07c 107/06; C09b 29/06, 29/28
U.S. Cl. 260—199                             11 Claims

ABSTRACT OF THE DISCLOSURE

Monoazo dyestuffs of general formula

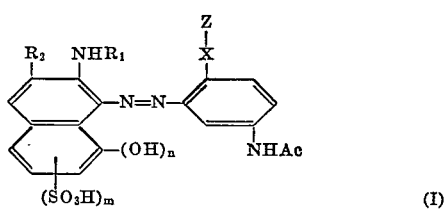

(I)

in which Ac represents a non-reactive acyl residue, X represents —O— or —S— and Z represents a carbocyclic aromatic residue, $R_1$ represents hydrogen or an optionally substituted alkyl, cycloalkyl or aryl residue, $R_2$ denotes hydrogen or the sulphonic acid group, $m$ represents the numbers 0, 1 or 2 and $n$ represents the numbers 0 or 1, as well as processes for their manufacture and their use for dyeing nitrogen-containing fibre materials.

---

The subject of the present invention are monoazo dyestuffs of general formula

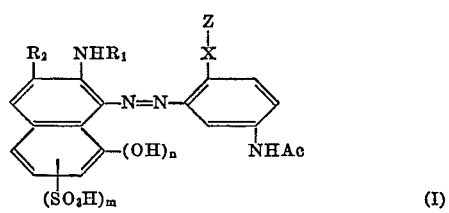

(I)

in which

Ac represents a non-reactive acyl residue, X represents —O— or —S— and Z represents a carbocyclic or heterocyclic aromatic residue, $R_1$ represents hydrogen or an optionally substituted alkyl, cycloalkyl or aryl residue, $R_2$ denotes hydrogen or the sulphonic acid group, $m$ represents the numbers 0, 1 or 2 and $n$ represents the numbers 0 or 1, as well as processes for their manufacture and their use for dyeing nitrogen-containing fibre materials.

Suitable acyl residues Ac are, for example, the formyl residue, and optionally substituted alkylcarbonyl, aralkyl- carbonyl, alkoxycarbonyl and arylcarbonyl, alkylsulphonyl, arylsulphonyl and aminocarbonyl residues and triazinyl residues.

Possible carbocyclic and heterocyclic aromatic residues Z are especially phenyl or naphthyl residues which can be substituted, for example by halogen, alkyl, alkoxy, acylamino, carboxy, carbalkoxy or sulphonic acid groups, and also tetrahydronaphthyl residues as well as hetero-aromatics having O or N as the hetero-atom, such as those of the quinoline series, carbazole series or diphenylene oxide series.

The alkyl residues $R_1$ can be straight-chain or branched and can for example be further substituted by halogen, hydroxyl, nitrile, carboxylic acid, carbalkoxy, carbonamide or alkylcarbonamide groups. Possible aryl residues $R_1$ are preferably phenyl residues which are optionally substituted by halogen, alkyl and/or carboxylic acid groups.

Particularly valuable dyestuffs of General Formula I are dyestuffs of the following Formulae II and III:

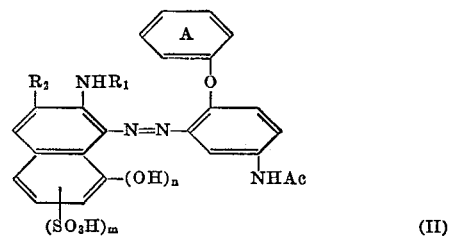

(II)

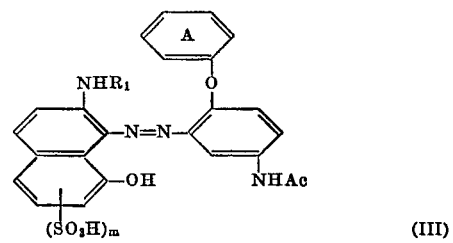

(III)

in which

Ac represents the formyl residue, an optionally substituted alkylcarbonyl, aralkylcarbonyl, alkoxycarbonyl, arylcarbonyl, alkylsulphonyl, arylsulphonyl or aminocarbonyl residue or a heterocyclic acyl residue, the benzene ring A can optionally be substituted by halogen, alkyl, alkoxy, acylamino, carboxy, carbalkoxy or sulphonic acid groups or be fused with cycloalkyl, aryl or a heterocyclic structure, $R_1$ denotes hydrogen, an optionally substituted alkyl, cycloalkyl or aryl residue and $R_2$ denotes hydrogen or the sulphonic acid group, and $m$ represents the numbers 0, 1 or 2 and $n$ represents the numbers 0 or 1.

An outstanding group with the dyestuffs of General Formula I are the dyestuffs of formula

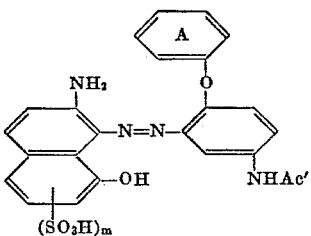

(IV)

especially those of formula

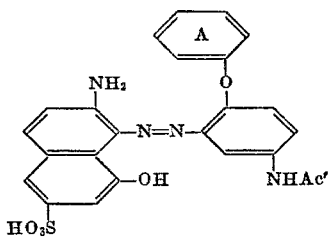

(V)

in which

Ac' represents the acyl residue of a lower saturated aliphatic carboxylic acid, the benzene ring A is optionally substituted by halogen, alkyl, alkoxy, acylamino, carboxyl, carbalkoxy or sulphonic acid groups, and $m$ represents the numbers 0, 1 or 2.

As acyl residues Ac or Ac' there may for example be mentioned: formyl, acetyl, chloracetyl, methoxyacetyl, ethoxyacetyl, propionyl, butyryl, isobutyryl, valeroyl, isovaleroyl, methoxycarbonyl, ethoxycarbonyl, benzylcarbonyl, benzoyl, 3- and 4-chlorobenzoyl, 3-methylbenzoyl, 3-trifluoromethylbenzoyl, methylsulphonyl, ethylsulphonyl, benzenesulphonyl, 4-methylbenzenesulphonyl, methoxybenzenesulphonyl, aminocarbonyl, methylaminocarbonyl, dimethylaminocarbonyl, diethylaminocarbonyl and also diaminotriazinyl, which can monosubstituted or di-substituted at the N-atoms by non-reactive residues, for example 2,4-diaminotriazin-(1,3,5)-6-yl, 2,4-di-(methylamino)-triazin-(1,3,5)-6-yl, 2,4 - bis-(dimethylamino)-triazin-(1,3,5)-6-yl, 2,4-di-(n-butylamino)-triazin-(1,3,5)-6-yl, 2,4-di-(phenylamino)-triazin-(1,3,5)-6-yl, 2,4-dimethoxy-(1,3,5)-triazin-6-yl, 2-methoxy-4-ethoxy-(1,3,5)-triazin-6-yl, and 2-methoxy-4-amino-(1,3,5)-triazin-6-yl.

Suitable residues Z are for example: phenyl, 2-, 3- or 4-methylphenyl, 2,4-dimethylphenyl, 3,4-dimethylphenyl, 3, 5-dimethylphenyl, 2-, 3- or 4-chlorophenyl, 2,4-dichlorophenyl, 4-acetylphenyl, 3- or 4-carboxyphenyl, 3- or 4-carbomethoxyphenyl, 2-, 3- or 4-sulphophenyl, tetrahydronaphthyl-(2), naphthyl-(2), quinolyl-(5), 2-hydroxy-1-methylquinolyl-(4), carbazolyl-(2) or diphenylene-oxidyl-(3) residues.

Suitable residues $R_1$ are for example: hydrogen, methyl, ethyl, β-hydroxyethyl, β-cyanethyl, isopropyl, cyclohexyl, phenyl, 2,6-dimethylphenyl, 2,4,6-trimethylphenyl or 2-methyl-5-carboxyphenyl residues.

The new dyestuffs of General Formula I are obtained by diazotising amines of general formula

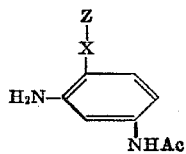

(VI)

and coupling with aminonaphthalene—or aminonaphtholsulphonic acids of general formula

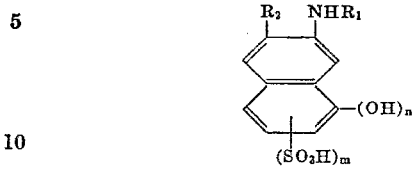

(VII)

in an acid medium. In Formulae VI and VII the residues AC, X, Z, $R_1$ and $R_2$ and $m$ and $n$ have the indicated significance.

In the dyestuffs thus obtained, an acylamino group NH—Ac can, if desired, be converted into a different acylamino group —NHAc.

For this purpose, the dyestuff containing an acylamino group, for example the dyestuff containing an acetylamino group, can be saponified to give the dyestuff of general formula

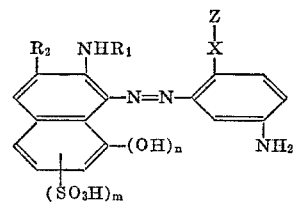

(VIII)

in which

X represents —O— or —S— and Z represents a carbocyclic or heterocyclic aromatic residue, $R_1$ represents hydrogen or an optionally substituted alkyl, cycloalkyl or aryl residue, $R_2$ denotes hydrogen or the sulphonic acid group, $m$ represents the numbers 0, 1 or 2 and $n$ represents the numbers 0 or 1, and of this dyestuff subsequently reacted with an acylating agent which forms a non-reactive acylamino group —NHAc.

As suitable amines of general Formula VI there may for example be mentioned:

2-amino-4-acetylaminodiphenyl-ether,
2-amino-4-propionylaminodiphenyl-ether,
2-amino-4-butyrylaminodiphenyl-ether,
2-amino-4-acetylamino-4'-methyldiphenyl-ether,
2-amino-4-acetylamino-4'-methyldiphenyl-ether,
2-amino-4-acetylamino-2'-chloro-diphenyl-ether,
2-amino-4-acetylamino-4'-chloro-diphenyl-ether,
2-amino-4,4'-di-(acetylamino)-diphenyl-ether,
2-amino-4-acetylamino-4'-carboxydiphenyl-ether,
2-amino-4-acetylamino-4'-carbomethoxydiphenyl-ether,
2-amino-4-acetylamino-4'-sulphodiphenyl-ether,
2-amino-4-acetylamino-3'-sulphodiphenyl-ether,
2-amino-4-carbomethoxyaminodiphenyl-ether,
2-amino-4-benzoyl-aminodiphenyl-ether,
2-amino-4-acetylaminophenylnaphthyl-(1')-ether,
2-amino-4-acetylamino-4'- or -5'-sulphophenylnaphthyl-(1')-ether,
2-amino-4-acetylamino-phenyl-5',6',7',8'-tetrahydronaphthyl-(1')-ether,
2-amino-4-acetylaminodiphenyl-thioether and
2-amino-4-propionylaminodiphenylthioether.

As suitable coupling components of general Formula VII there may for example be mentioined:

2-aminonaphthalene-5-sulphonic acid,
2-aminonaphthalene-6-sulphonic acid,
2-amino-naphthalene-7-sulphonic acid,
2-amino-8-hydroxynaphthalene-5-sulphonic acid, 2-amino-8-hydroxynaphthalene-6-sulphonic acid,
2-methylamino-8-hydroxynaphthalene-5- or -6-sulphonic acid,
2-phenylamino-8-hydroxynaphthalene-6-sulphonic acid,
2-amino-8-hydroxynaphthalene-3,6-disulphonic acid,
2-amino-8-hydroxynaphthaylene-5,7-disulphonic acid,
2-(2'-methyl-5'-carboxyphenyl)-amino-8-hydroxynaphthalene-6-sulphonic acid,
2-(2',6'-dimethylphenyl)-amino-8-hydroxynaphthalene-6-sulphonic acid, and
2-(2',4',6'-trimethylphenyl)-amino-8-hydroxynaphthalene-6-sulphonic acid.

The new dyestuffs dye fibre materials containing nitrogen, especially containing amide groups, such as wool, silk, synthetic polyamide fibres and synthetic polyurethane fibres in brilliant orange, yellowish red, red or bluish red shades. The resulting dyeings, especially those on synthetic polyamide materials, are distinguished by good fastness properties, especially by good wet fastness and in part very good light fastness. The levelling capacity and neutral affinity, and the ability to be combined with other suitable dyetsuffs, are also good for this material.

The examples which follow describe the manufacture of some monoazo dyestuffs according to the invention, and the table contains further examples obtainable according to similar methods. Unless otherwise stated, the parts in the examples are understood as parts by weight. The relationship of parts by weight to parts by volume is as of the kilogram to the litre. The temperatures are given in degrees centigrade.

EXAMPLE 1

24.8 parts (0.1 mol) of 2-amino-4-acetylamino-diphenylether are dissolved in 600 parts of water and 35 parts of 10 N hydrochloric acid and diazotized at 0° by dropwise addition of 23.1 parts of 30% strength sodium nitrite solution. After 30 minutes' further reaction the mixture is clarified with activated charcoal and excess nitrous acid is destroyed by means of amidosulphonic acid. 26 parts (0.1 mol) of 2-amino-8-hydroxynaphthalene-6-sulphonic acid and 7 parts of a polycondensation product of 1 mol of oleyl alcohol and 50 mols of ethylene oxide are dissolved in 1000 parts of water and sodium hydroxide solution to render the mixture weakly alkaline. Immediately prior to coupling, the mixture is adjusted to a pH value of 4.5 with glacial acetic acid and the diazonium salt solution and about 150 parts of 20% strength sodium acetate solution are simultaneously run in at 0–3° in about 10–15 minutes, so that a pH-value of 4.5 is maintained. After stirring for a further hour, 175 parts of 10 N hydrochloric acid and 22 parts of sodium chloride are added and the dyestuff of formula

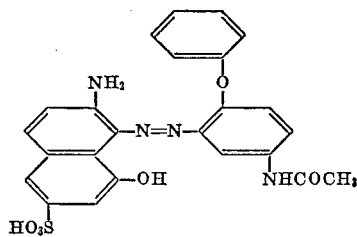

is isolated in the usual manner. The dyestuff is dissolved at 60° in 2800 parts of water and 20% strength aqueous ammonia to give a neutral solution and is again isolated after salting-out with sodium chloride. After drying at 80° the dyestuff represents a dark powder which dissolves in water to give a red colour. It dyes polyamide material in red shades, with the dyeings having good wet fastness and being distinguished by very good light fastness.

EXAMPLE 2

25.7 parts (0.1 mol) of 2-amino-4-propionylaminodiphenyl-ether in 1400 parts of water and 35 parts of 10 N hydrochloric acid are diazotized in the usual manner at 0–3° by dropwise addition of 23.1 parts of 30% strength sodium nitrite solution. After a further 40 minutes" reaction the mixture is clarified with activated charcoal and excess nitrous acid is destroyed with amidosulphonic acid. 23.8 parts (0.105 mol) of 2-aminonaphthalene-5-sulphonic acid are dissolved in 1000 parts of water and sodium hydroxide solution to give a neutral solution. This is adjusted to a pH-value of about 4.5 with glacial acetic acid and the diazonium salt solution is stirred in at 0–3°. About 150 parts of 20% strength sodium acetate solution are simultaneously added dropwise, so that a pH-value of 4.5 is maintained. After about 4 hours the mixture is adjusted to a pH-value of 7 with 20% strength aqueous ammonia and the dyestuff of formula

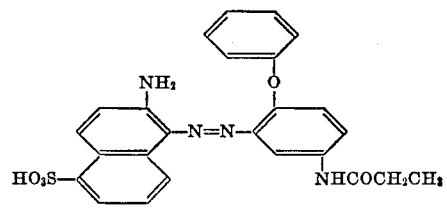

is separated out at 60° by adding sodium chloride and is isolated in the usual manner. After drying it is obtained as a dark brown powder which dissolves in water to give an orange colour and dyes polyamide material in brilliant orange shades. The dyeings have good wet fastness and light fastness.

EXAMPLE 3

37.9 parts (0.1 mol) of 2-amino-4-acetylamino-4'-sulpho-diphenyl-ether are dissolved in 1100 parts of water at pH 4–5. After adding 23.1 parts of 30% strength sodium nitrite solution, 31 parts of 10 N hydrochloric acid are poured in abruptly at 10° with intensive stirring. After 1 hour the mixture is clarified with activated charcoal and excess nitrous acid is destroyed with amidosulphonic acid. 26.8 parts (0.13 mol) of 2-amino-2-hydroxynaphthalene-6-sulphonic acid dissolved in 280 parts of water to give a neutral solution, and this is adjusted to a pH-value of 4 with glacial acetic acid and poured into the diazonium salt solution. After stirring overnight, the dyestuff is largely separated out by adding sodium chloride and potassium chloride, and is isolated in the usual manner. After drying at 80°, the dyestuff of formula

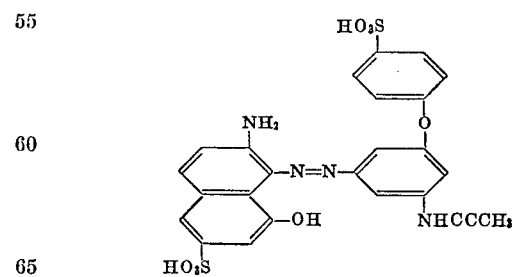

represents a dark powder which easily dissolves in water to give a red colour and dyes polyamide material in pure red shades. The dyeings have good wet fastness and light fastness.

If instead of the diazo components and coupling components indicated in Examples 1–3 the components indicated in the table below are use, valuable dyestuffs are again obtained which dye polyamide in the indicated colour shades.

TABLE

| Diazo component | Coupling component | Colour shade on polyamide |
|---|---|---|
| 2-amino-4-acetylaminodiphenyl-ether | 2-amino-8-hydroxynaphthalene-5-sulphonic acid | Red |
| Do | 2-(2'-methyl-5'-carboxyphenyl)-amino-8-hydroxy-naphthalene-6-sulphonic acid | Claret |
| Do | 2-amino-8-hydroxynaphthalene-5,7-disulphonic acid | Red |
| 2-amino-4-acetylamino-4'-methyldiphenyl-ether | 2-amino-8-hydroxynaphthalene-6-sulphonic acid | Red |
| Do | 2-aminonaphthalene-5-sulphonic acid | Orange |
| 2-amino-4-acetylamino-4'-chlorodiphenyl-ether | 2-amino-8-hydroxynaphthalene-6-sulphonic acid | Red |
| Do | 2-aminonaphthalene-5-sulphonic acid | Orange |
| 2-amino-4-acetylamino-2'-chlorodiphenyl-ether | 2-amino-8-hydroxynaphthalene-6-sulphonic acid | Red |
| 2-amino-4-acetylamino-2'-methyldiphenyl-ether | do | Red |
| 2-amino-4,4'-di-(acetylamino)-diphenyl-ether | do | Red |
| 2-amino-4-carbomethoxyaminodiphenyl-ether | do | Red |
| 2-amino-4-acetylaminodiphenyl-thioether | do | Red |
| Do | 2-amino-8-hydroxynaphthalene-5-sulphonic acid | Red |
| Do | 2-aminonaphthalene-5-sulphonic acid | Orange |
| 2-amino-4-acetylamino-4'-sulphodiphenyl-ether | 2-amino-8-hydroxynaphthalene-5-sulphonic acid | Red |
| 2-amino-4-acetylamino-3'-sulphodiphenyl-ether | do | Red |
| Do | 2-amino-8-hydroxynaphthalene-6-sulphonic acid | Red |
| 2-amino-4-propionylamino-diphenyl-ether | do | Red |

We claim:

1. A monoazo dyestuff of the formula

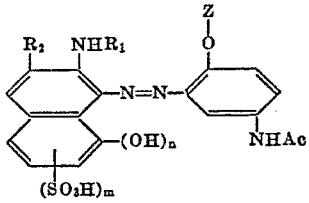

in which

Ac is formyl, alkylcarbonyl with 1–4 carbon atoms in the alkyl group, alkylcarbonyl with 1 to 4 carbon atoms in the alkyl group and substituted with chloro, methoxy or ethoxy, alkoxycarbonyl with 1 to 4 carbon atoms in the alkoxy group, benzylcarbonyl, phenylcarbonyl, phenylcarbonyl substituted with chloro, methyl or trifluoromethyl, $C_1$–$C_2$-alkylsulfonyl, benzenesulfonyl, benzenesulfonyl substituted with methyl or methoxy, aminocarbonyl, methylaminocarbonyl, dimethylaminocarbonyl or diethylaminocarbonyl;

Z is phenyl; naphthyl; phenyl or naphthyl substituted with chloro, $C_1$–$C_4$-alkyl, acetyl, acetylamino, carboxyl, carbolower alkoxy or sulfonic acid; or tetrahydronaphthyl;

$R_1$ is hydrogen, methyl, ethyl, β-hydroxyethyl, β-cyanethyl, isopropyl, cyclohexyl, phenyl, 2,6-dimethylphenyl, 2,4,6-trimethylphenyl or 2-methyl-5-carboxyphenyl;

$R_2$ is hydrogen or —$SO_3H$;

$n$ is 0 or 1; and $m$ is 0, 1 or 2.

2. The monoazo dyestuff of claim 1 in which Z is phenyl; naphthyl; phenyl or naphthyl substituted with chloro, $C_1$–$C_4$-alkyl, acetyl, acetylamino, carboxy, carbomethoxy or sulfonic acid; or tetrahydronaphthyl.

3. A monoazo dyestuff of the formula

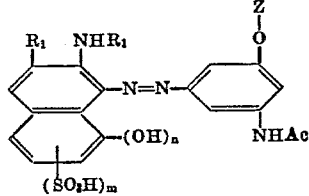

in which

Ac is formyl, acetyl chloroacetyl, methoxyacetyl, ethoxyacetyl, propionyl, butyryl, isobutyryl, valeroyl, isovaleroyl, methoxycarbonyl, ethoxycarbonyl, benzylcarbonyl, benzoyl, 3-chlorobenzoyl, 4-chlorobenzoyl, 3-methylbenzoyl, 3-trifluoromethylbenzoyl, methylsulfonyl, ethylsulfonyl, benzenesulfonyl, 4-methylbenzenesulfonyl, methoxybenzenesulfonyl, aminocarbonyl, methylaminocarbonyl, dimethylaminocarbonyl or diethylaminocarbonyl;

Z is phenyl; naphthyl; phenyl or naphthyl substituted with chloro, $C_1$–$C_4$-alkyl, acetyl, acetylamino, carboxy, carbo lower alkoxy or sulfonic acid; or tetrahydronaphthyl;

$R_1$ is hydrogen, methyl, ethyl, β-hydroxyethyl, β-cyanethyl, isopropyl, cyclohexyl, phenyl, 2,6-dimethylphenyl, 2,4,6-trimethylphenyl or 2-methyl-5-carboxyphenyl;

$R_2$ is hydrogen or —$SO_3H$;

$n$ is 0 or 1; and $m$ is 0, 1 or 2.

4. The dyestuff of claim 3 in which

Z is phenyl; naphthyl; phenyl substituted with $C_1$–$C_4$ alkyl, chloro, acetyl, acetylamino, carboxyl, carbomethoxy or sulphonic acid; or tetrahydronaphthyl.

5. The dyestuff of claim 3 in which

Ac is acetyl or propionyl;

Z is phenyl; or phenyl substituted with sulphonic acid, chloro, or methyl;

$R_1$ and $R_2$ are H; and $m$ and $n$ are 1.

6. The dyestuff of the formula

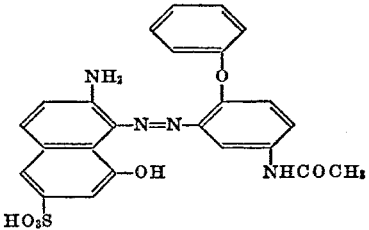

7. The dyestuff of the formula

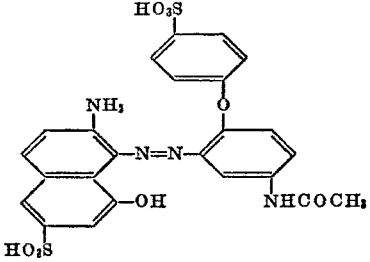

8. The dyestuff of the formula

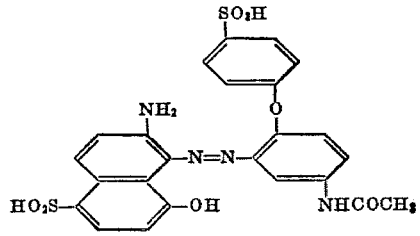

9. The dyestuff of the formula
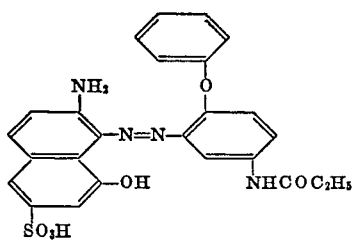
10. The dyestuff of the formula
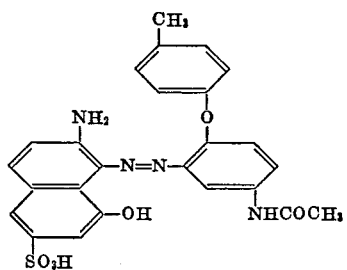
11. The dyestuff of the formula
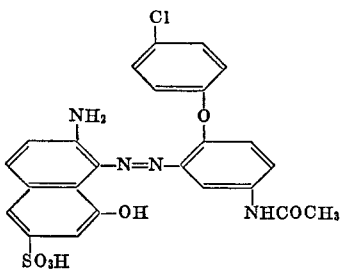
References Cited
UNITED STATES PATENTS
| | | | |
|---|---|---|---|
| 3,247,184 | 4/1966 | Blass et al. | 260—196 X |
| 3,432,485 | 3/1969 | Neier | 260—145 |
| 3,142,669 | 7/1964 | Feeman | 260—199 |
| 2,273,517 | 2/1942 | Fischer | 260—199 X |
| 2,750,377 | 6/1956 | Hindermann | 260—199 X |
| 3,104,237 | 9/1963 | Frisch | 260—196 |
LEWIS GOTTS, Primary Examiner
C. F. WARREN, Assistant Examiner
U.S. Cl. X.R.
260—152, 153, 155, 164, 196

UNITED STATES PATENT OFFICE
CERTIFICATE OF CORRECTION

Patent No. 3,709,871          Dated January 9, 1973

Inventor(s) Reiner Ditzer, et al

It is certified that error appears in the above-identified patent and that said Letters Patent are hereby corrected as shown below:

Column 3, line 55, after the word "5-dimethyl-phenyl, the following has been omitted --4-tert.-butyl-phenyl, 4-chloro-3,5-dimethyl-phenyl,---.

Column 4, line 52, "-4'-" should read -- -2'- ---.

Column 6, line 44, "(0.13 mol)" should read ---(0.103 mol) ---.

Column 6, line 45, after the word "acid" the word ---are--- was omitted.

Column 6, line 64, in the formula, "NHCCCH$_3$" should read --NHCOCH$_3$--.

Signed and sealed this 19th day of November 1974.

(SEAL)
Attest:

McCOY M. GIBSON JR.          C. MARSHALL DANN
Attesting Officer          Commissioner of Patents